Inventor:
Walter Peyinghaus

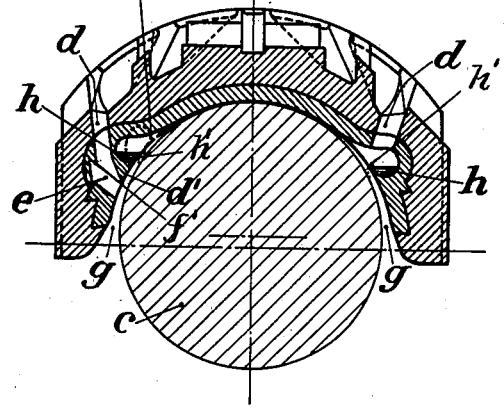
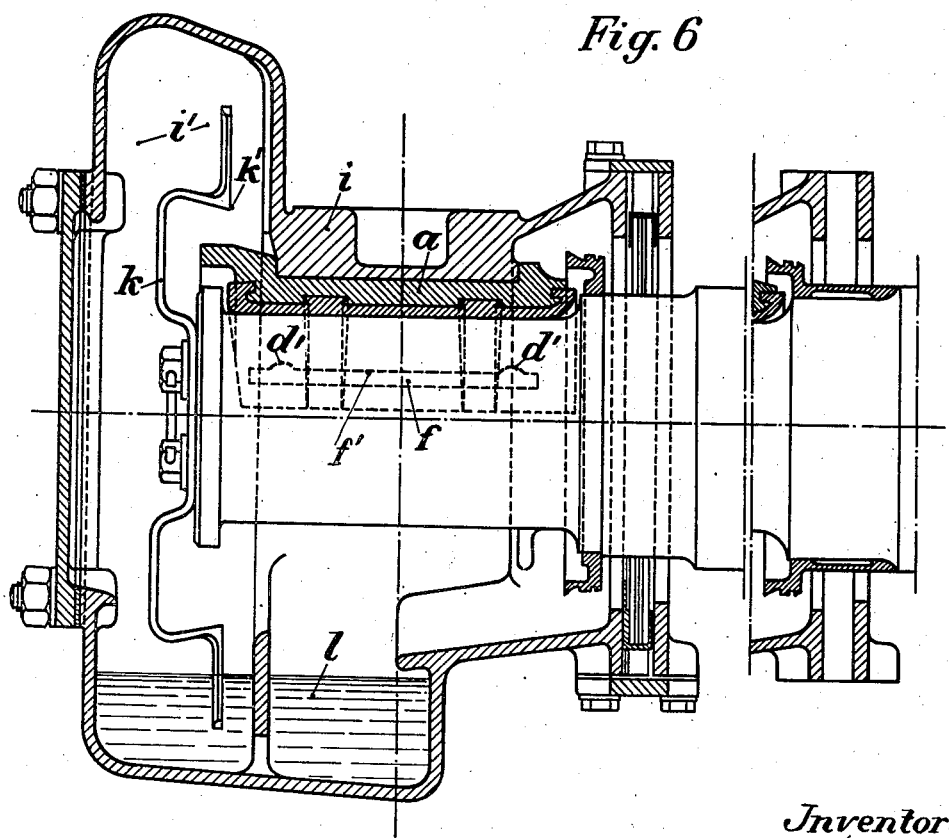

Patented May 3, 1938

2,115,746

UNITED STATES PATENT OFFICE 2,115,746

LUBRICATED AXLE BEARING

Walter Peyinghaus, Egge, near Volmarstein-on-the-Ruhr, Germany

Application May 10, 1929, Serial No. 362,114
In Germany May 11, 1928

10 Claims. (Cl. 308—79.1)

My invention relates to axle bearings and has for its object to provide an improved method of and mechanism for lubricating the journals of axle bearings.

The hitherto employed methods of and apparatus for lubricating axle bearings are based upon the physical principal of adhesion, the axle journal being rotated in contact with a porous stuffing member which is adapted to absorb or suck up lubricant from a lubricant supply vessel. The quantities of lubricant taken up by the journal in this manner are clearly determined in the case of an axle bearing by the surface formation of the axle journal and also by the viscosity of the lubricant. These conditions limit the quantity of lubricant taken up through adhesion to a definite amount which cannot be increased. More recently however the velocities and the loads of track vehicles have increased to such an extent that the quantities of lubricant which cling to the journal through adhesion no longer suffice for forming the desired adhering lubricating film between the axle journal and the bearing brass. The attempt has been made to flood the axle journal with oil and thus obtain a splashing and cooling lubrication, because by reduction of the temperatures between the bearing brass and the axle journal in the bearing surface the viscosity of the oil, and hence its lubricating qualities are maintained unchanged. If the bearing surfaces are not cooled, the lubricant adhering to such surfaces becomes heated and then becomes thinner and more mobile and consequently less capable of effecting proper lubrication. As a result the friction increases and hence the frictional heat, whereupon the lubricant becomes heated still further, the lubricating capacity falls still more and thus a still further increase in temperature occurs. In this way progressive increases of the temperature occurs until the journal begins to run hot with consequent danger thereto.

It has already been attempted to conduct lubricant to the axle journal in excess by overflowing the same with lubricant; the devices accomplishing this result proved, however, unsuccessful because they were so constructed that the lubricant was wiped off the journal before it was formed into a lubricating film and could create the desired fluid friction between the bearing brass and the journal. The attempt was also made to raise the oil by means of air pressure and to introduce the oil in between the bearing surfaces by such pressure. This solution of the problem proved however unsatisfactory, because if the pressure failed for any reason, all of the bearings were no longer lubricated, so that all the bearings of a train began to run hot. These proposals remained permanently in the experimental stage and have never been adopted in practice. The present invention solves the problem of lubricating axle journals which are subjected to heavy loads by dripping the journal with the lubricant upon its upper surface, where the tendency of the oil to flow down into the sump is reduced not only because the oil film is supported by the journal but is constantly carried into the top or crown of the wedge-shaped space between the journal and brass, so that a large body of oil is maintained at and in advance of the area of contact between the journal and brass. In such method of lubrication the quantity of lubricant taken up by the journal is completely independent of the amount which is limited by the phenomenon of adhesion; in fact it becomes possible to conduct to the journal as much lubricant as can be circulated. Moreover, the conducting of the lubricant to the journal by dripping removes the heretofore existing close arrangement between the bearing brass and the axle journal. For example when the lubricant is conducted to the journal through a lubricating groove in the bearing brass, the latter had to lie close to the journal surface both above and below the groove in order that the lubricant might actually reach the journal and not flow off unused along the inner surface of the bearing brass and in this way return to the lubricant supply well without having performed its lubricating function. Every bearing brass therefore had to be closely fitted to an axle journal. As a result it was impossible simply to place a bearing brass which was in stock upon the axle journal when the worn brass had to be quickly replaced by a new one; it was necessary first to touch up the brass, that is, to hollow out the bearing brass surface and fit the brass upon the journal. This close fitting of the brass to the journal is eliminated by the present invention because of the fact that the place at which the oil is dripped off the brass on to the journal necessarily has to be at a distance from the journal and it is immaterial how large this distance is. In this way the heretofore necessary close fitting relationship between the bearing brass and the axle journal is removed, so that every brass can serve with every journal and thereby a uniform brass is realized, an ideal which has been aimed at for decades in railway operations but has never been attained.

In a further development of the inventive idea I provide, in addition to the oil dripping or feeding place which drips the primary stream of lubricant on the journal, a groove in the bearing brass surface having an edge from which the oil is adapted to drip, such groove running longitudinally of the brass, that is, parallel to the journal axis. This feature produces the following secondary lubrication. The lubricant dripping on to the journal, which lubricant can drip in a very abundant quantity, in any case in a quantity which is greater than that necessary for forming an adhering lubricant film between the journal and the running seat of the journal in the bearing brass, is rolled out at the crown of the brass between the journal and such running seat. The excess lubricant flows back along the inner surface of the bearing brass to the groove which is provided with the dripping edge. At this dripping edge the course of the lubricant, which as a result of the rolling out at the crown of the brass has become distributed over the whole length of the brass in the direction of the journal axis, is interrupted so that it again drips off and drips the axle journal in a secondary stream along the whole length of the same.

For a more detailed description of the present invention, reference is had to the accompanying drawings which show by way of example two embodiments of the invention. In said drawings, Figs. 1 and 2 represent respectively a front view and a rear view of the left half of the bearing brass, the right half of such figures being shown in section on the lines 1—1 and 2—2 of Fig. 4;

Fig. 5 represents a transverse section through a journal box equipped with a modified form of journal bearing constructed in accordance with the present invention; and Fig. 6 is a longitudinal section through a journal box equipped with a journal bearing constructed in accordance with the invention.

Figure 1:
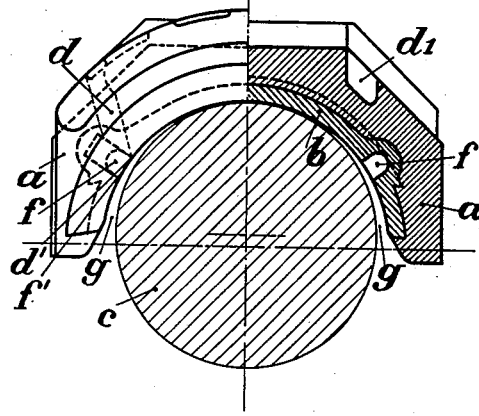

The construction about to be described provides an improved lubricating brass which is constructed to surround the journal with considerable play both to enable the brass to be employed as a standard brass for axle journals of different sizes, and to provide wedge-shaped inlet spaces for lubricant as required by the hydrodynamic lubricant theory.

With bearing brasses of the type referred to wherein the flanks of the brass are spaced a considerable distance laterally of the journal, the heretofore necessary fitting of the bearing brass to the axle journal is eliminated, and any bearing brass can be employed with any axle journal within the dimensional limits permitted in railway practice, so that it becomes possible to employ one and the same brass, that is, a standard brass, with axle journals of various sizes. Variations in the diameters of the axle journals occur by reason of the fact that certain changes in the diameter of the axle journal in operation, as the result of wear and of refinishing, are permitted by railway regulations. For example, according to the regulations of the German State Railway, an original axle journal diameter of 118 mm. may be reduced to 109 mm. before the whole wheel assembly must be replaced. On the other hand, the hydrodynamic lubricant theory requires wedge-shaped inlet spaces in order that lubricant entering such spaces may be placed under pressure which acts to bring about the formation of a continuous and adherent lubricant film, and thus, for both of these reasons, wedge-shaped inlet spaces between the axle journal and the bearing brass are indispensable. This relationship, however, gives rise to very great difficulties in connection with the transfer of the oil from the bearing brass to the journal. Prior to the present invention the oil was conducted to the journal, in the type of brass in question, only with the aid of so-called collecting grooves, that is, grooves were cut in the bearing brass surface facing the axle journal, the bearing brass surface lying closely against the journal surface since it was fitted thereto, and the grooves being maintained filled with oil. The oil collected in these grooves and reached the axle journal surface by overflow contact, the collecting grooves being kept filled with oil by oil-feeding means positioned above the same. These collecting grooves, however, failed to affect lubrication as soon as wedge-shaped inlet spaces were provided, that is, when the flanks of the brass were spaced considerably from the journal. The reason for this is that the lubricant, because of its great force of adhesion, has the capacity of clinging strongly to the bearing brass surface, and it has the further capacity of flowing downwardly along the surfaces so long as such surfaces lie in the gravity path of the oil. Upon the provision of wedge-shaped inlet spaces between the axle journal surface and the bearing brass surface, the lubricant was free to flow away along the brass surface clinging to the part of the bearing brass surface leading from the collecting grooves and flowing toward the flanks of the brass, from which it dripped off in irregular streams to the lubricant sump without contacting the journal. Prior to the present invention, therefore, no means were known for reliably providing the axle journal with lubricant over its entire length when wedge-shaped inlet spaces were formed between it and the brass.

The problems above set forth are solved in a highly satisfactory manner by the present invention. According to the invention, the bearing brass is so constructed that the lubricant is released from the bearing brass surface above the axle journal projection, that is, within the horizontal diameter of the journal but at a distance from the journal. In this way it is compelled to reach or fall upon the journal by gravity, and the journal receives the quantity of lubricant required for building a closed and continuous film in the wedge-shaped inlet spaces, fluid friction being thereby attained. To attain these ends the structure of the bearing brass is characterized by the fact that there is provided a flow impeding means in the form of, for example, a drip edge shaped to compel the lubricant reaching the same to drop by gravity upon the surface of the journal, the drip edge being arranged preferably in the brass and in or near the running surface of the brass. The brass is preferably provided also with grooves extending longitudinally of the journal and has a surface running downwardly toward the running surface of the brass, such running surface likewise running upwardly from the line of intersection, the latter thus representing the lowermost edge in such surfaces, so that lubricant reaching such edge cannot flow away along these surfaces but must drop off the edge. Suitable means are provided for supplying oil to the edge as will be described hereinbelow.

Figure 2:
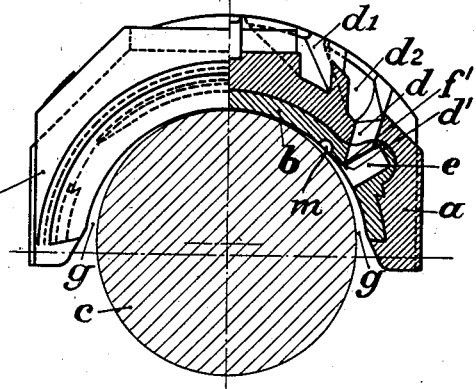
Figure 3:
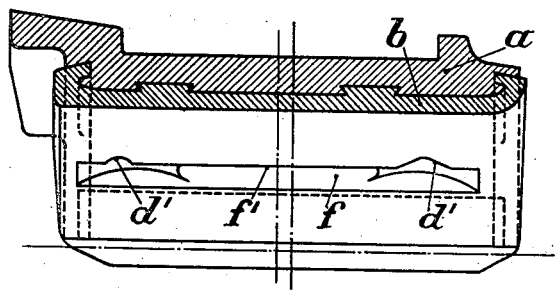
Fig. 3 is a longitudinal section through the center of the bearing brass shown in Fig. 4.
Figure 4:
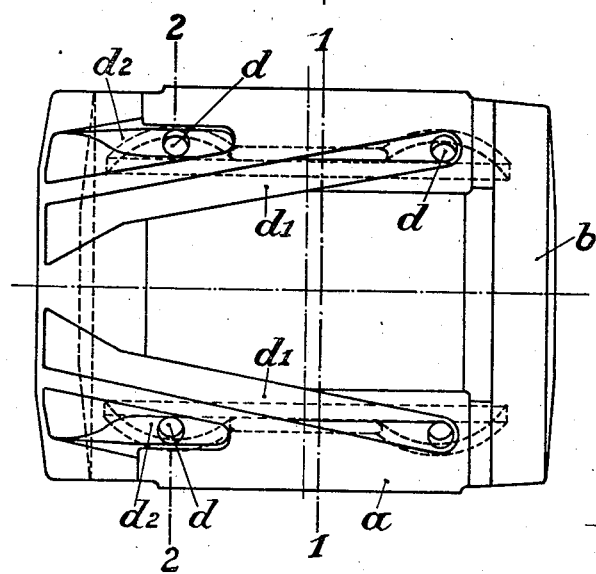
Fig. 4 represents a top view of the upper surface of the bearing brass.

Referring now to the drawings, the letter $a$ in all figures designates the bearing brass provided with a white metal lining $b$ and inclosing the axle journal c, the inner surface of the lining being of greater diameter than the journal so that wedge-shaped entering spaces g are provided. The bearing brass, as shown in Fig. 4, is provided on its upper side with channels $d_1$, $d_2$, which are connected with the inner smooth surface of the bearing brass through transverse bores d. The lubricating means is conveyed to the channels $d_1$, $d_2$, by the mechanism shown in Fig. 5, as described below, and thence flows to the feeding or discharging places. The feeding places, as shown in Figs. 1 and 2, are made by arranging undercut recesses e in such a manner at the mouth of the transverse bores d that the edge d' adjacent to the axle journal is lower than its surroundings, i. e., is lower than the surfaces defining the same, or, stated differently, is defined by upwardly inclined surfaces, viewed from such edge, thus forming a draining edge, so that the lubricating means conveyed to the transverse bores d drip off the edges. As is shown in Fig. 3, the edge d' is made in the form of a roof turret, so that the primary dripping, which without this feature, would be punctiform, spreads out over the width of the turret-like draining structure.

In accordance with the present invention, the following additional features are provided. Recesses f are arranged in the surface of the bearing brass longitudinally of the latter, i. e. parallel to the journal axis, in the form of longitudinal grooves, in such a manner that the edge f' between the groove f and the surface of the bearing brass is, like the edge d', lower than the faces producing said edge. The lubricant drips off the draining edges d' and is taken along by the movement of the journal and conveyed to the space g between the inner surface of the bearing brass and the axle journal. As quantities of lubricant can be fed to the journal by the draining edges d' which are in excess of the amount necessary for forming a continuous film between the journal and brass, a part of such lubricant at the inner bearing surface is returned to the draining edge f' along the inner surface of the brass. As the lubricant can flow no further, it drops off the edge f' in a secondary stream onto the axle journal. The excess lubricant will not reach the journal merely along the width of the turret-like edge d', but, having been rolled out at the crown of the brass over the whole length thereof, it will fall upon the journal in the form of a band as wide as the brass, so that by such secondary bedripping of the journal, an adhering film of oil is provided under all conditions throughout the length of the journal at the areas of friction between the journal and brass.

The bearing may be provided with a central oil feeding channel as shown at $d_3$ in Fig. 2, and also with any known form of oil-distributing grooves, as shown conventionally at m.

It is within the scope of the present invention to utilize the secondary dripping of the axle journal without the primary dripping, the journal receiving in any other suitable manner, the quantity of lubricant which is necessary for producing a film upon the rolling out of the lubricant at the crown of the brass, and for providing the excess which returns to the dripping edge f' in the bearing brass surface. I have further found however that the combination of the primary with the secondary lubrication above-described produces excellent results. As will be seen from Fig. 2, the recesses e extend upwardly slightly beyond the bores d. This construction prevents oil traveling down the bore d from working its way down to the lower wall of recess e and thence to the lowermost edge of the brass from which it would drip off without striking the axle journal; and compels such oil to flow toward the draining edge d' from which it drips off on to the journal.

Fig. 5 shows a modified construction in which, in advance of the drip edge f', (considered from the standpoint of the direction of flow of the oil down the inner face of the brass) is arranged a well h into which flows excess oil from the crown of the brass and which has an edge h' over which flows a band of oil into contact with the journal. The edge h' may be sufficiently close to the journal for the overflowing film of oil to wipe the journal. Any excess oil flows down the face of the journal to the drip edge f' from which it falls onto the journal in a more or less continuous band. It will, however, generally be found that the use of the primary and secondary drip edges d' and f', as shown in Figs. 1 to 4, or even of the edges f' alone, will be sufficient to insure adequate lubrication at all loads and speeds. With the construction shown at the left of Fig. 5, a given brass, to make the overflow edge h' effective, should be used only with journals whose diameters are within certain limits; however, even if the journal should be of so much smaller diameter than the brass that the overflowing film of oil from h' does not contact the journal, the journal will be coated with the oil dripping from the edge f'. It is necessary only that the oil fall from the edge f' inside the horizontal diameter of the journal.

At the right of Fig. 5 is shown only an overflow groove, which is sufficient for effecting lubrication on reverse travel.

Fig. 6 shows the arrangement of the bearing brass a in the axle box i, the mechanism being shown in longitudinal section. The circulating device k is located within the enlarged portion i' of the axle box, such circulating device raising the lubricant from the supply sump l at the bottom of the axle box to a level above the channels $d_1$, $d_2$. At low velocities the lubricant drips, at higher velocities it flows in the form of a thin stream and at still greater velocities it is hurled off the edge k' of the circulating member k and falls upon an enlarged collar forming part of the brass a and flows directly therefrom into the channels $d_1$, $d_2$. From the latter it drips upon the journal through the transverse bores d in a primary or secondary stream, or in both primary and secondary streams and is carried to the place of contact between the journal and the brass where it produces a fluid friction which gives the sliding bearing approximately the favorable friction coefficients of the ball and roller bearings without at the same time bringing into play the great disadvantages of the latter.

Variations from the specific construction illustrated may be resorted to within the scope of the appended claims without departing from the spirit of the invention.

I claim:

1. A journal bearing having means for reducing static as well as sliding friction therein, said means including the bearing body having upon its inner face a plurality of side distributing grooves, oil feeding passages extending from the upper face of the bearing and opening into the grooves, and upwardly extending oil cavities at the junction of said passages with the side grooves and having walls so disposed as to compel delivery of the oil passing through said oil feeding passages to the axle above its horizontal center.

2. A journal bearing having means for reducing static as well as sliding friction therein, said means including the bearing body having upon its inner face a plurality of side distributing grooves, oil feeding passages extending from the upper face of the bearing and opening into the grooves, and upwardly extending oil cavities at the junction of said passages with the side grooves and having walls so disposed as to compel delivery of the oil passing through said oil feeding passages to the axle above its horizontal center, said cavities being of sufficient depth to extend above the outlets of said passages.

3. A journal bearing having means for reducing static as well as sliding friction therein, said means including a bearing body provided with an inner face having a greater radius than the radius of the axle to be lubricated and also having upon its inner face side distributing grooves, the upper edges of which side grooves cooperate with the surface of the axle to provide a capillary oil space, and oil feeding passages extending from the upper face of the bearing and opening into the grooves.

4. A journal bearing having means for reducing static as well as sliding friction therein, said means including a bearing body provided with an inner face having a greater radius than the radius of the axle to be lubricated, and also provided with a plurality of side distributing grooves whose upper edges cooperate with the adjacent spaced surface of the axle to provide a capillary oil space for retaining the lubricant when the axle is at rest, oil feeding passages extending from the upper face of the bearing and opening into the grooves, and upwardly extending oil cavities at the junction of said passages with the side grooves and having their upper walls so disposed as to compel delivery of the oil to the said capillary space.

5. Axle bearing comprising, in combination, an axle box, a bearing brass in said box, a journal supporting said brass, a lubricant sump below the journal, lubricant feeding means located above the journal and comprising flow impeding means including a drip edge shaped to compel the lubricant reaching the same to drop by gravity upon the surface of the journal, and mechanism for conducting lubricant from said sump to said lubricant feeding means.

6. Axle bearing comprising, in combination, an axle box, a bearing brass in said box, a journal supporting said brass, said brass so formed as to provide wedge-shaped inlet spaces between the brass and journal, a lubricant sump below the journal, lubricant feeding means located above the journal and comprising flow impeding means including a drip edge shaped to compel the lubricant reaching the same to drop by gravity upon the surface of the journal, and mechanism for conducting lubricant from said sump to said lubricant feeding means.

7. Axle bearing comprising, in combination, an axle box, a bearing brass in said box, a journal supporting said brass, a lubricant sump below the journal, lubricant feeding means in said brass located above the journal and comprising flow impeding means including a drip edge shaped to compel the lubricant reaching the same to drop by gravity upon the surface of the journal, and mechanism for conducting lubricant from said sump to said lubricant feeding means.

8. Axle bearing comprising, in combination, an axle box, a bearing brass in said box, a journal supporting said brass and of smaller diameter than the brass, means arranged to drip the journal with lubricant in a primary stream directly as it is fed to the brass, and grooves in the bearing brass surface extending longitudinally of the journal, at least one of the surfaces of the grooves intersecting the running surface of the brass being upwardly inclined and running upwardly from the line of intersection with the running surface of the brass which likewise runs upwardly from such line of intersection, the intersecting edge thus representing the lowest points in the two surfaces defining the same, said edge being spaced from but overlying the surface of the journal, whereby lubricant reaching such edge is compelled to drop by gravity upon the journal, the lower portions of said brass being spaced from the journal to provide wedge-shaped inlet spaces for lubricant therebetween.

9. Axle bearing comprising, in combination, an axle box, a bearing brass in said box, a journal supporting said brass and of smaller diameter than the brass, recesses in the upper side of said brass, bores in the brass between said recesses and the running surface of the brass, a drip edge at the mouth of the said bores in the vicinity of said running surface and spaced from the surface of the journal, said drip edge forming the intersection between two upwardly inclined surfaces viewed from such edge, whereby lubricant reaching such edge is compelled to drop by gravity upon the journal, said edge being spaced from the surface of the journal, means for conducting lubricant to one of the surfaces defining said drip edge, longitudinal grooves in the surface of the brass extending in the direction of the journal, at least one of the surfaces of the grooves intersecting the running surface of the brass being upwardly inclined and running upwardly from the line of intersection with the running surface of the brass which likewise runs upwardly from such line of intersection, the intersecting edge thus representing the lowest points in the two surfaces defining the same, said edge being spaced from but overlying the surface of the journal whereby lubricant reaching such edge is compelled to drop by gravity upon the journal, said longitudinal grooves being in communication with said bores, the lower portions of said brass being spaced from said journal to provide wedge-shaped inlet openings for lubricant therebetween.

10. An axle bearing as set forth in claim 7, wherein the drip edge is defined in part by the upper wall of a groove in the axle brass, said lubricant feeding means including a bore in the axle brass leading into the groove, the depth of the groove extending beyond the rearmost line of intersection of the bore with the groove, whereby all of the lubricant passing down the bore is compelled to flow toward the drip edge.

WALTER PEYINGHAUS.